(12) United States Patent
Harper et al.

(10) Patent No.: US 8,031,671 B2
(45) Date of Patent: Oct. 4, 2011

(54) METHODS AND SYSTEMS FOR PROVIDING IMPROVED HANDOFFS IN A WIRELESS COMMUNICATION SYSTEM

(75) Inventors: Matthew H. Harper, Salem, NH (US); Janakiraman Senthilnathan, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 966 days.

(21) Appl. No.: 10/893,846

(22) Filed: Jul. 19, 2004

(65) Prior Publication Data

US 2005/0025132 A1    Feb. 3, 2005

Related U.S. Application Data

(60) Provisional application No. 60/488,152, filed on Jul. 17, 2003.

(51) Int. Cl.
*H04W 4/00* (2009.01)

(52) U.S. Cl. ........ 370/331; 370/335; 370/338; 370/342; 370/349; 370/354; 370/395; 370/401; 455/406; 455/408; 455/410; 455/436; 455/437; 455/439; 455/511; 709/220; 713/171

(58) Field of Classification Search .................. 370/401, 370/310–350, 354, 395; 455/436–444, 406, 455/408, 410, 511; 703/220; 713/171
See application file for complete search history.

(56) References Cited

U.S. PATENT DOCUMENTS

| 6,628,671 | B1 | 9/2003 | Dynarski et al. | |
|---|---|---|---|---|
| 6,959,190 | B2 * | 10/2005 | Choi et al. | 455/442 |
| 6,973,309 | B1 * | 12/2005 | Rygula et al. | 455/436 |
| 6,990,088 | B2 | 1/2006 | Madour et al. | |
| 7,068,669 | B2 * | 6/2006 | Abrol et al. | 370/401 |
| 7,154,868 | B1 * | 12/2006 | Sharma et al. | 370/331 |
| 7,441,269 | B2 * | 10/2008 | Jones et al. | 726/14 |
| 2002/0154627 | A1 * | 10/2002 | Abrol et al. | 370/352 |
| 2003/0053429 | A1 * | 3/2003 | Choi et al. | 370/331 |
| 2003/0054823 | A1 * | 3/2003 | Choi et al. | 455/436 |
| 2003/0063584 | A1 | 4/2003 | Sayeedi | |
| 2003/0158967 | A1 * | 8/2003 | Tripathi et al. | 709/245 |
| 2004/0008649 | A1 * | 1/2004 | Wybenga et al. | 370/338 |

FOREIGN PATENT DOCUMENTS

CA    2359040 A1    3/2002

(Continued)

OTHER PUBLICATIONS

Supplemental EP Search Report issued for EP047787121.2 (PCT/US2004/023338), Dated May 11, 2010 (3 pages).

(Continued)

*Primary Examiner* — Dwayne Bost
*Assistant Examiner* — Amancio Gonzalez
(74) *Attorney, Agent, or Firm* — Wilmer Cutler Pickering Hale and Dorr LLP

(57) ABSTRACT

Methods and systems are provided for using a PDSN in a wireless communication network that includes multiple IP addresses and multiple corresponding physical interfaces. Through the use of multiple IP addresses and interfaces, the throughput of the PDSN may be substantially increased. Additionally, the multiple IP addresses and interfaces may be used to provide redundancy in order to protect against software or hardware failures. According to the methods and systems of the invention, moreover, the risk of internal hard handoffs resulting from the use of a PDSN having multiple IP addresses and interfaces is eliminated or at least substantially reduced.

29 Claims, 5 Drawing Sheets

FOREIGN PATENT DOCUMENTS

| WO | WO-03/030483 A1 | 4/2003 |
|---|---|---|
| WO | WO-2005/010708 A2 | 2/2005 |

OTHER PUBLICATIONS

Fourth Amended Complaint, *UTSTARCOM, Inc., v. Starent Networks, Corp., et al.*, In the United States District Court for the Northern District of Illinois Eastern Division, Case 1:07-cv-02582, Document 207, Filed Sep. 25, 2008, pp. 1, 48, 70 and 91, (4 pages).

Perkins, C., "IP Mobility Support," Network Working Group, Request for Comments: 2002, Category: Standard Track, Oct. 1996, http://www.ietf.org/rfc/rfc2002.txt?number=2002. (68 Pages).

* cited by examiner

METHODS AND SYSTEMS FOR PROVIDING IMPROVED HANDOFFS IN A WIRELESS COMMUNICATION SYSTEM

CROSS REFERENCE TO RELATED APPLICATION

This application claims the benefit under 35 U.S.C. §119(e) of U.S. Provisional Patent Application No. 60/488,152, filed Jul. 17, 2003, which is hereby incorporated by reference herein in its entirety.

FIELD OF THE INVENTION

The present invention relates to wireless communication networks. More particularly, this invention relates to improved handoffs in wireless communication networks that use one or more packet data serving nodes (PDSNs) having multiple IP addresses.

BACKGROUND OF THE INVENTION

Wireless communication systems and networks are used in connection with many applications, including, for example, satellite communications systems, portable digital assistants (PDAs), laptop computers, and portable communication devices (e.g., cellular telephones). One significant benefit that wireless communication networks provide to a user of such an application is the ability to connect, or stay connected to, a network (e.g., the Internet) as long as the user is within range of the wireless communication network.

Three major access techniques have been developed which are used to share the available bandwidth in a wireless communication system. Two of these techniques are referred to as time division multiple access (TDMA) and frequency division multiple access (FDMA). In TDMA systems, two or more signals (e.g., voice or data signals) share a single channel. In particular, in TDMA systems, multiple signals are transmitted over the same channel by allocating to the transmission of each signal a different time interval. In FDMA systems, on the other hand, the available frequency spectrum is divided into narrow channels, where each signal to be transmitted is assigned to a respective channel. The third technique, which is most relevant to the invention and is described below, is referred to as code division multiple access (CDMA).

CDMA systems operate by dividing a radio spectrum to be shared by multiple users through the assignment of unique codes. CDMA systems assign a unique code to each signal that is to be transmitted, and are thereby able to spread many simultaneous signals across a wideband spread spectrum bandwidth. Using the respective codes, the signals can then be detected and isolated from the other signals that are being transmitted over the same bandwidth.

FIG. 1 is a simplified illustration of one embodiment of a CDMA wireless communication system 100 in which the present invention may be implemented. As the main features of wireless communication system 100 are well know to those versed in the art, only a brief description of its components will now be provided. Further explanation will be provided below as necessary to aid the understanding of the principles of the present invention described herein.

As shown, wireless communication system 100 includes a plurality of mobile subscribers (MSs) 101-109. Mobile MSs 101-109, which are also known as mobile stations, mobile nodes, and by other names, each function as an Internet Protocol (IP) client (Simple IP and/or Mobile IP, as explained below). MSs 101-109 may each be any suitable device that is capable of communicating with a wireless network, such as a cellular telephone or a laptop computer with a wireless modem.

Wireless communication system 100 also includes a plurality of base stations or base transceiver stations (BTSs) 111-113 for managing wireless links to MSs 101-109. BTSs 111-113 act as the interface between the network and MSs 101-109, in that they convert digital data into radio signals and vice versa. Although not shown, each of BTSs 111-113 generally has an associated radio tower or antenna and communicates with various MSs 101-109 using radio links. In particular, BTSs 111-113 communicate with various MSs 101-109 through the modulation and transmission of sets of forward signals, while BTSs 111-113 receive and demodulate sets of reverse signals from various MSs 101-109 that are engaged in a wireless network activity (e.g., a telephone call, Web browsing session, etc.).

As shown in FIG. 1, BTSs 111-113 connect to one or more base station controllers (BSCs) 121-122 (e.g., using un-channelized T1 facilities or direct cables, although this is not required). BSCs 121-122 are used to interface (aggregate) all radio frequency (RF) traffic arriving from the antennas of BTS 111-113, and to provide this traffic to a mobile switching center (MSC) 123. As known in the art, BSCs 121-122 are generally responsible for managing the radio resources for one or more BTSs 111-113. For example, BSCs 121-122 may handle radio-channel setup, frequency hopping, and handovers (which are described below). Moreover, MSC 123 is responsible for providing the interface between the radio access network (RAN), which includes BTSs 111-113, BSCs 121-122, and PCFs 131-132, and a public switched telephone network (PSTN). In particular, MSC 123 controls the signaling required to establish calls, and allocates RF resources to BSCs 121-121 and packet control functions (PCFs) 131-132.

PCFs 131-132 are used to route IP packet data between MSs 101-109 (when within range of one of BTSs 111-113) and packet data service nodes (PDSNs) 141-143. PDSNs 141-143, in turn, are used to provide access to one or more IP networks 151-153, which may be, for example, the Internet, intranets, applications servers, or corporate virtual private networks (VPNs). In this manner, PDSNs 141-143 acts as an access gateway. Although not shown in FIG. 1, PDSNs 141-143 generally also act as a client for Authentication, Authorization, and Accounting (AAA) AAA servers. As known in the art, AAA servers are used to authenticate and authorize MSs 101-109 before access is granted to one of IP networks 151-153.

It will be understood that nine MSs 101-109, three BTSs 111-113, two BSCs 121, two PCFs 131-132, and three PDSNs 141-143 have been shown in FIG. 1 solely for the sake of adding clarity to the description of the present invention. Persons versed in the art will appreciate, however, that the invention is not limited by the particular number of these components that exist in wireless communication system 100. Moreover, it will be understood that, although not shown in FIG. 1, various MSs 101-109 may have radio connections with more than one of BTSs 111-113. Similarly, a single PCF 131-132 may support more than one of BSCs 121-133 in wireless communication system 100. Persons versed in the art will also appreciate that, although the invention is described with reference to PDSNs 141-143, the principles of the present invention discussed herein can be used with other types of network access servers (NASs). In particular, it should be understood that the invention is applicable to any current or future access technologies where MSs 101-109 use the point-to-point (PPP) protocol as a client access protocol with an access gateway.

As known by those versed in the art, two modes of operation are typically offered by a PDSN 141-143. These two modes of operation are often referred to as the "Simple IP" mode and the "Mobile IP" mode, both of which are described in greater detail below. In either mode, the act of an MS 101-109 moving between different PCFs 131-132 and keeping the same PDSN 141-143 is termed a "soft handoff." The act of an MS 101-109 moving between PCFs 131-132 and also switching physical PDSNs 141-143, on the other hand, is termed a "hard handoff." Similarly, in prior wireless communication systems, a "hard handoff" will result anytime the IP address of a PDSN 141-143 changes for a call (even if the same physical PDSN 141-143 remains in use).

In general, hard handoffs are undesirable in both the Simple IP mode and the Mobile IP mode. In the case of Simple IP, a hard handoff requires the renegotiation of all call-related access processing parameters (e.g., A11, PPP, and IP). As known by those versed in the art, renegotiation of such parameters is both time consuming and disruptive to data applications that may be running on the MS 101-109. In the case of Mobile IP, a hard handoff requires the same renegotiation of the call processing parameters as in the Simple IP case plus Mobile IP parameters. However, this procedure is less disruptive to data applications as the MS 101-109 is able to retain the same assigned IP address, and there is no disruption of the data path for the MS 101-109.

Due to the undesirability of hard handoffs, PDSNs 141-143 have typically been designed to have only a single IP address and a single corresponding physical (layer 3) interface. This is due in large part to prevent the occurrence of an "internal hard handoff," which refers to the case where a hard handoff is thought to have occurred (and the handoff is treated as such) even though an MS 101-109 has not moved to a new PDSN 141-143. For example, in the case of a PDSN 141-143 having multiple IP addresses, an internal hard handoff may occur when an MS 101-109 roams from a first PCF 131-132 to a second PCF 132, and the second PCF 132 mistakenly uses a the wrong (i.e., a different) IP address of the same PDSN 141-143. However, the use of only a single IP address and interface for a PDSN 141-143 significantly and undesirably limits the throughput of the PDSN 141-143. That is, the throughput of the PDSN 141-143 is limited to the bandwidth provided by the single physical interface. Additionally, the use of only a single IP address and interface for a given PDSN 141-143 makes it impossible (or at least much more difficult) to provide a desired level of redundancy to protect against the effects of software or hardware failures.

Accordingly, it is desirable to provide systems and methods for using PDSNs 141-143 in a wireless communication system 100 that include multiple IP addresses, and multiple corresponding physical interfaces, while eliminating or at least substantially reducing the likelihood of internal hard handoffs.

SUMMARY OF THE INVENTION

In accordance with the principles of the present invention, systems and methods are provided for using PDSNs 141-143 in a wireless communication network 100 that include multiple IP addresses and multiple corresponding physical interfaces. Through the use of multiple IP addresses and interfaces, the throughput of a PDSN 141-143 may be substantially increased. Additionally, the multiple IP addresses and interfaces may be used to provide redundancy in order to protect against software or hardware failures. According to the systems and methods of the invention, moreover, the risk of internal hard handoffs resulting from the use of a PDSN having multiple IP addresses and interfaces is eliminated or at least substantially reduced.

In one embodiment, the invention provides a wireless communication system that includes a first BTS that is associated with a first PCF and a second BTS that is associated with a second PCF, a PDSN having multiple IP addresses, and an MS that uses the first PCF to establish a first session using a first IP address of the PDSN when in an area being served by the first BTS and that uses the second PCF to establish a second session with a second IP address of the PDSN when in an area served by the second BTS, where the handoff between the first IP address and the second IP address of the PDSN is treated as a soft handoff.

In a second embodiment, the invention provides systems and methods for performing a handoff in a mobile communication system that uses a PDSN having more than one IP address, wherein the method includes establishing a first session, for a MS in the mobile communication system, using a first IP address of the PDSN, and establishing a second session, for the MS, using a second IP address of the PDSN, where the handoff between the first IP address and the second IP address of the PDSN is treated as a soft handoff.

In a third embodiment, the invention provides a wireless communication system that includes means for establishing a first session, for a mobile station (MS) in the mobile communication system, using a first IP address of the PDSN, means for establishing a second session, for the MS, using a first IP address of the PDSN, and means for treating the handoff between the first IP address and the second IP address of the PDSN as a soft handoff.

In a fourth embodiment, the invention provides a PDSN having multiple IP addresses for use in a wireless communication system, the PDSN having a first session with a mobile station (MS) using a first of its IP addresses and a second session with the same MS using a second of its IP addresses, wherein the handoff between the first IP address and the second IP address of the PDSN is treated as a soft handoff.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout.

DETAILED DESCRIPTION OF THE INVENTION

Figure 1:
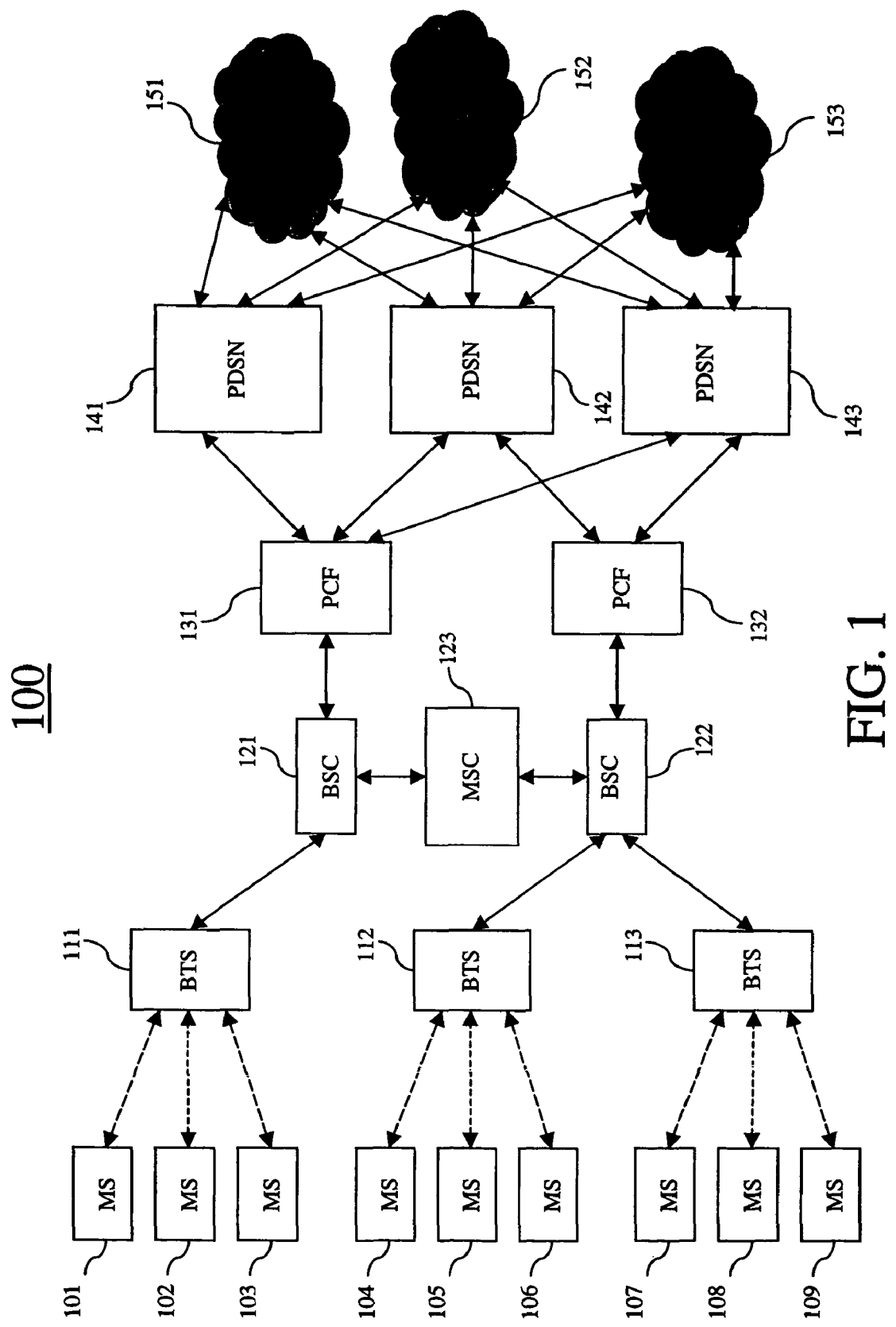
FIG. 1 is a simplified illustration of one embodiment of a CDMA wireless communication system 100 in which the present invention may be implemented.

An important goal in wireless communication system 100 is to provide MSs 101-109 with a durable IP address that persists even as an MS 101-109 moves with from one cell, which refers to the area covered by a BTS 111-113, to another cell (thus breaking a point-to-point radio connection and making a new one). PDSNs 141-142 offer two modes of operation relating to IP address mobility. These two modes, as mentioned above, are Simple IP and Mobile IP. As the systems and methods described herein according to the present invention are useful to enhance the operation of both the Simple IP and the Mobile IP modes, a summary of these modes is first provided.

Simple IP, which provides a relatively low level of IP address mobility, is specified in IS-835, which is hereby incorporated by reference herein in its entirety. In general, Simple IP allows multiple cells to be connected to a single PDSN 141-143. Thus, as long as MS 101-109 moves only among these cells (i.e., within a restricted geographic region), the PDSN 141-143 is able to keep track of the MS 101-109 and assign it the same IP address each time it reconnects via a new cell. For example, if one of MSs 101-109 moves from one PCF 131-132 to another PCF 131-132 but remains with the same PDSN 141-143 (as in the case of a soft handoff), then the MS 101-109 is able to retain the same IP address when it reconnects to the PDSN 141-143 using the second PCF 131-132. However, if an MS 101-109 moves to a cell that is handled by a different PDSN 131-132 (as in the case of a hard handoff), a new IP address will need to be assigned, resulting in a temporary loss of network connection. As mentioned above, in prior wireless communication systems, a similar result may be obtained when the MS 101-109 remains with the same physical PDSN 141-143 but has been assigned to a different one of the multiple IP addresses of the PDSN 141-143.

Mobile IP, which unlike Simple IP provides mobility even across service providers and PDSNs, is specified in IS-835 and RFC-2002, which are hereby incorporated by reference herein in their entirety. In general, Mobile IP enables an MS 101-109 to move from cell to cell, even into cells supported by different PDSNs 141-143, while maintaining a single IP address such that network connectivity is substantially continuous. This is unlike the Simple IP, in which an MS 101-109 must always obtain a new IP address when roaming across different PDSNs 141-143.

The above is accomplished in Mobile IP using two mobility agents which are referred to as the Home Agent (HA) and the Foreign Agent (FA). In general, the FA is held with (contained in) a PDSN 141-143, and the HA is a standalone entity. The home provider of an MS 101-109 provides a static home IP address and an HA which maintains this IP address for the MS 101-109. It will be understood that the "home provider" may be any suitable entity that operates the home network where the HA is attached. For example, the home provider may be a corporation or Internet Service Provider (ISP) that operates the HA and assigns addresses to MSs 101-109. Then, as the MS 101-109 connects to a new PDSN 141-143 (which functions as an FA), a tunnel is established between the FA and the HA to carry the traffic for MS 101-109. As the MS 101-109 connects to another PDSN 141-143, also functioning as an FA, a new tunnel is established from the new FA to the same HA through which traffic is routed.

More specifically, each time an MS 101-109 is out of range from its home provider, it uses the FA of a PDSN 141-143 in order to obtain a "care-of" address. The care-of address, which serves to identify the current location of the MS 101-109, is discovered using either agent advertisement or agent solicitation, both of which are known in the art. In general, FAs broadcast agent advertisements at regular intervals. If an MS 101-109 does not wish to wait for the periodic advertisement, it can broadcast (or multicast) a solicitation that will be answered by any FA that receives the solicitation.

Once a care-of address has been obtained by the MS 101-109, it must be registered by the MS 101-109 with its HA. This process begins with the MS 101-109 sending a registration request to the FA (PDSN 141-143), which in turn generates a corresponding Mobile IP (MIP) Registration Request to the HA with the care-of address. Once the request is received by the HA, it typically adds the necessary information to its routing table, approves the request, and sends a registration reply back to the FA (PDSN 141-143) which in turn forwards it back to the MS 101-109. Upon accepting the request, the HA also begins to associate the home address of the MS 101-109 with the care-of address that was received from the MS 101-109. The HA maintains this address for the "lifetime" of the registration (e.g., for a predetermined period of time). It will be understood that, although not described, the registration process generally also requires the HA to obtain authentication of the registration information from MS 101-109.

After the registration has been completed as described above, the HA intercepts any traffic destined to the static IP address (home address) of the MS 101-109 and tunnels it to the care-of address registered with it. The FA unencapsulates the traffic and forwards it to the MS 101-109. Traffic from the MS 101-109, on the other hand, can either be directly delivered to its destination, or reverse-tunneled (by the FA) to the HA for delivery to its final destination.

Figure 2:
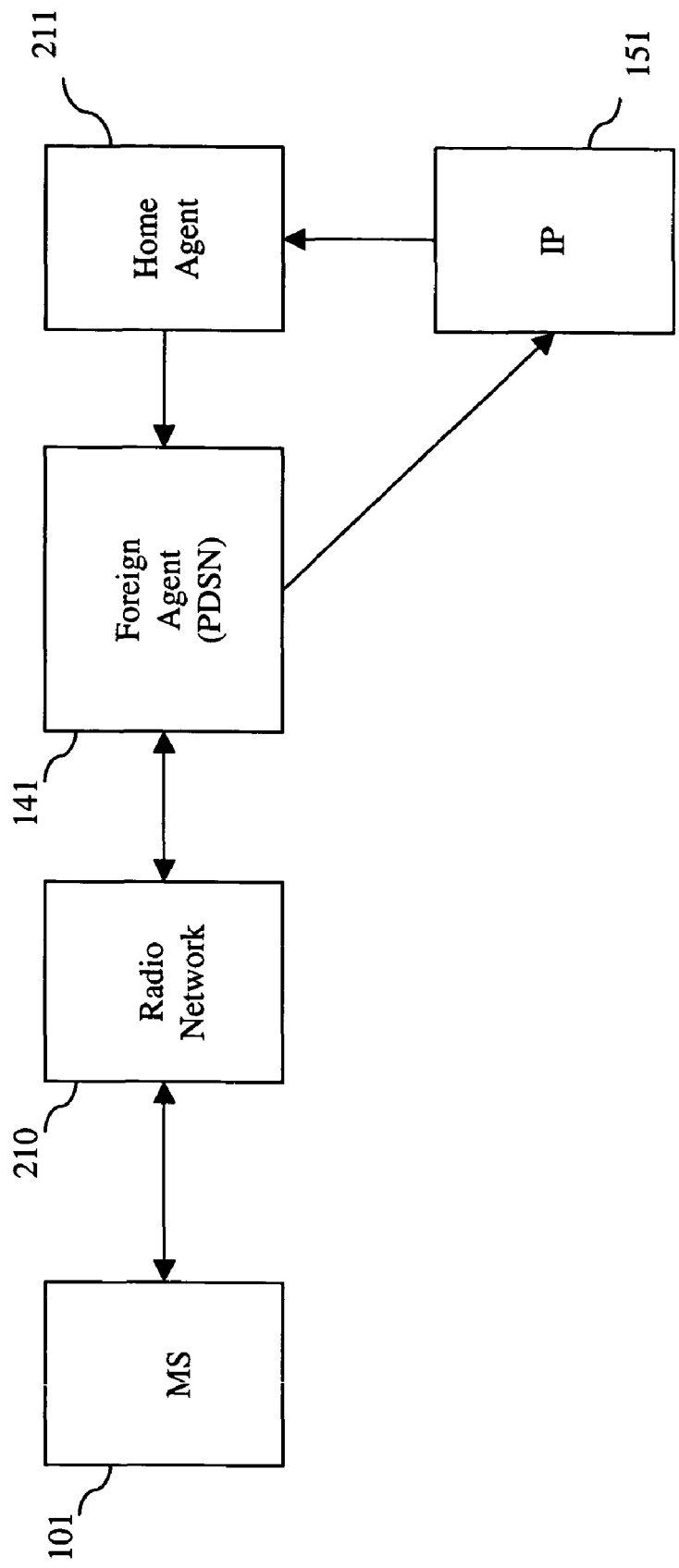
FIG. 2 is a simplified illustration showing the data flow associated with a typical Mobile IP session.

FIG. 2 is an illustration of a typical Mobile IP data flow involving MS 101, radio network 210 (which includes, for example, BTS 111, BSC 121, and PCF 131), FA (PSDN) 141, HA 211, and IP network 151. As shown, data flow (e.g., datagrams, which are logical groupings of information sent as a network layer unit over the Internet) being sent from IP network 151 using standard IP routing to MS 101 is intercepted by HA 211. The data flow is then tunneled to the care-of address for MS 101 that has been registered. This data flow is then de-tunneled and delivered to MS 101 using radio network 210. For data flow sent by MS 101, standard IP routing may be used for delivery to its final destination, or the data may be forwarded by the PDSN 141 over a reverse-tunnel to the HA.

As mentioned above, hard handoffs are undesirable in both the Simple IP and the Mobile IP. In particular, in the case of the Simple IP, a hard handoff requires the renegotiation of all access parameters (including PPP) because the new PDSN 141-143 is unaware of the previous PPP session state (as mandated by IS-835). This includes assigning MS 101-109 a new IP address, as well as data compression dictionaries, packets filters, a firewall state, network-side tunnels, etc., before traffic can flow again to and from MS 101-109. As a result of this required renegotiation of call parameters, data applications that may be running on the MS 101-109 may be disrupted, essentially requiring the applications to terminate their service.

Hard handoffs in Mobile IP are less disruptive in Mobile IP compared to Simple IP because network-layer (IP) parameters are not renegotiated. However, there can be significant delays in reestablishing a Mobile IP tunnel between the PDSN (FA) and the HA for a given MS 101-109. As known in the art, such delays can be disruptive to packets in transit to the MS 101-109.

One problem with using PDSNs 141-143 that have multiple IP addresses and multiple corresponding physical interfaces is that hard handoffs might result even when a call is being switched within the same physical PDSN 141-143. For example, PCFs 131-132 will normally try to avoid the generation of hard handoffs by maintaining the same PDSN 141-143 for a given MS 101-109, but this requires that the PCFs 131-132 exchange information among themselves regarding which PDSN 141-143 should handle a given call. This process is often impossible in a large multi-vendor network. Nevertheless, there are many situations for which it would be desirable to use PDSNs 141-143 having multiple IP addresses. For example, a PDSN 141-143 with multiple IP addresses and interfaces is typically able to achieve much greater throughput (bandwidth) than a PDSN 141-143 having only a single IP address and interface. In particular, the existence of multiple IP addresses and interfaces associated with a single PDSN 141-143 makes it possible to feed data through multiple interfaces (rather than only a single interface), thereby enabling greater bandwidth. Additionally, for example, it may be desirable to have a PDSN 141-143 be known by multiple addresses in order to provide redundancy (and therefore, greater reliability). For example, multiple addresses are useful in cases where a network connected between a PCF 131-132 and a PDSN 141-143 becomes unavailable (e.g., due to a software or hardware failure). In this situation, assuming there is redundancy, a different network (associated with a different address of PDSN 141-143) can be used.

Figure 3:
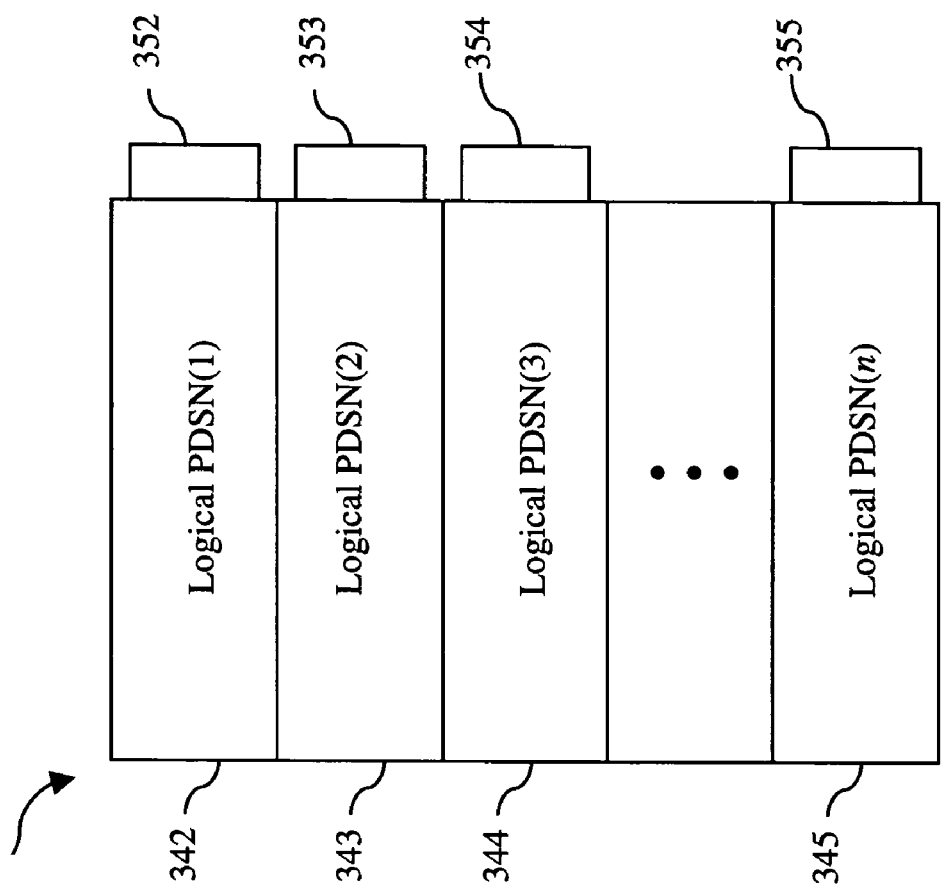
FIG. 3 is a simplified illustration of a single physical PDSN with n different IP addresses.

The present invention is useful (in both Simple IP and Mobile IP) in allowing the use of PDSNs 141-143 having multiple IP addresses, and multiple physical interfaces, while eliminating or substantially reducing the likelihood of internal hard handoffs as an MS 101-109 moves from one PCF 131 to another PCF 132 in wireless communication system 100. FIG. 3 illustrates such a PDSN 341 having multiple IP addresses that may be used in accordance with the principles of the present invention. As shown, PDSN 341 includes n logical PDSNs 342-345 (i.e., logical PDSN(1) through logical PDSN(n)). It will be understood that the term "logical PDSN" as used herein merely refers to the functions in PDSN 341 that are associated with a particular IP address and its corresponding physical (layer 3) interface. Accordingly, PDSN 341 is "known by" n different IP addresses, where each IP address has its own physical (or logical) interface. As also shown in FIG. 3, PDSN 341 includes physical interfaces 352-355, corresponding to logical PDSNs 342-345, respectively. It will be understood that, alternatively, logical interfaces (not shown) may be used.

In prior art communication systems, the transfer of a call from one logical PDSNs 342-345 to another (e.g., when an MS 101-109 moves to a different PCF 131-132 that fails to reconnect the MS 101-109 with the correct logical PDSN 342-345) is generally treated as a hard handoff. In turn, this handoff would undesirably require renegotiation of all call parameters, such as PPP, Quality of Service (QoS) state (traffic policing/shaping/marking state), MIP state, tunneling state (L2TP, IPSEC, IP/IP, IP/GRE), and security parameters such as packet filtering and firewall state. However, according to the principles of the present invention, when a call arrives at a logical PDSN 342-345 of the single physical PDSN 341, and the previous PDSN for the call was one of the other logical PDSNs 342-345, the higher-layer (also referred to as "upper-layer") call functions are maintained between the calls and the PPP is not renegotiated. Accordingly, the only things that need to be changed are the low level transfer parameters. This is accomplished in accordance with the invention by permitting the higher-layer call functions associated with an established A10/A11 layer (e.g., PPP) to be moved between services associated with one IP address in a PDSN 341 and another IP address in the same physical PDSN 341. (Although not described in detail herein because it is known in the art, it should be understood that A11 protocols are used to set up an A10 tunnel over which all the data associated with a mobile subscriber is routed.)

Figure 4:
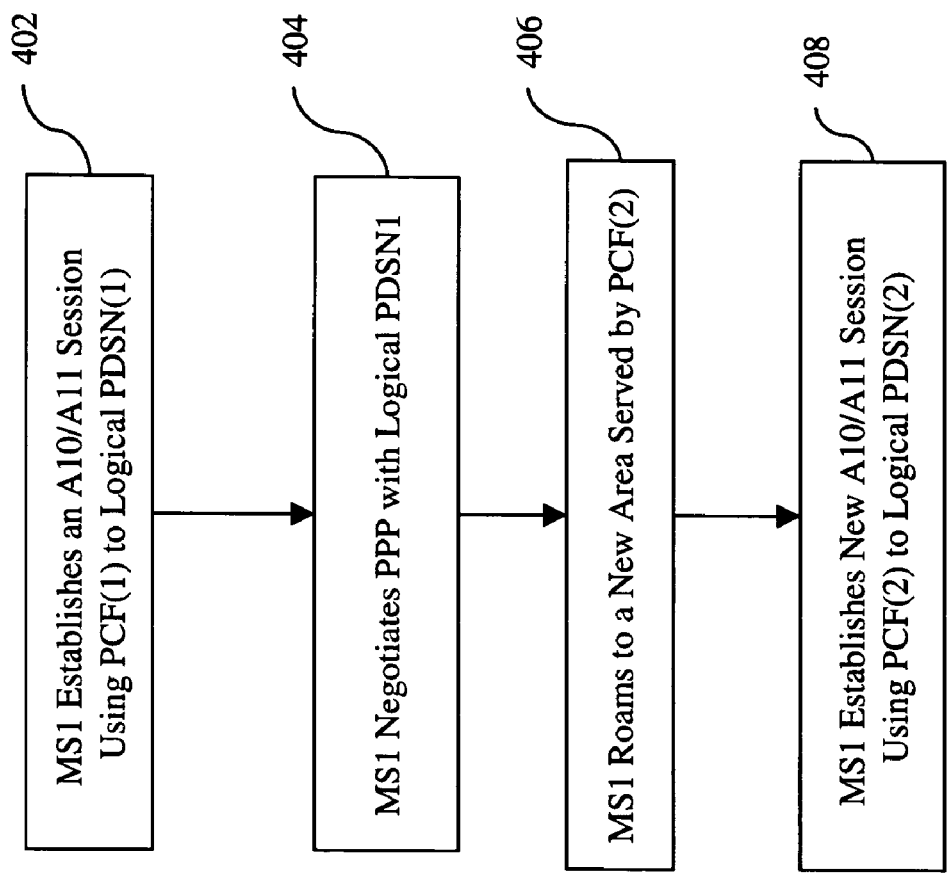
FIG. 4 is a flow chart illustrating the steps performed according to one embodiment of the present invention in eliminating or at least substantially reducing the likelihood of internal hard handoffs when using a PDSN such as the one illustrated in FIG. 3.

FIG. 4 is a flow chart illustrating the steps performed according to one embodiment of the present invention in eliminating or at least substantially reducing the likelihood of internal hard handoffs when using a PDSN 341 such as shown in FIG. 3. In describing the steps or the flow chart shown in FIG. 4 (as well as the flow chart shown in FIG. 5, which is described further below), for simplicity, the mobile station of interest will be referred to as "MS1," the first PCF that MS1 uses will be referred to as "PCF(1)," while the second PCF (to which MS1 roams) will be referred to as "PCF(2)." Additionally, the first and second logical PDSNs being discussed will be referred to as "PDSN(1)" and "PDSN(2)."

In step 402, MS1 uses PCF(1) to establish an A10/A11 session to PDSN(1). In particular, PCF(1) sends an A11 registration request (REG-REQ) to PDSN(1) using any method that is known in the art. In response to the REG-REQ of PCF(1), PDSN(1) sends an A11 registration response (REG-RSP) back to PCF(1). Next, in step 404, MS1 negotiates the necessary PPP parameters with PDSN(1) and an IP address is assigned to MS1. Again, because this negotiation is know in the art, it is not described in detail herein.

In step 406, MS1 roams to a new area that is served by PCF(2), which tries to establish a new connection for MS1. For some reason (e.g., configuration problems), at this time, PCF(2) selects PDSN(2), rather than the proper PDSN(1). Next, in step 408, MS uses PCF(2) to establish a new A10/A11 session with PDSN(2) (which was selected by PCF(2)).

Generally speaking, in prior art wireless communication systems, establishing a new session with PDSN(2) would be similar in terms of requirements (e.g., renegotiation of PPP, etc.) to a hard handoff that occurs when using a new physical PDSN. According to the present invention, however, this hard handoff is "turned into" a soft handoff. In other words, the many or all of the problems associated with conventional hard handoffs (compared to conventional soft handoffs) are eliminated. This is accomplished in step 408, which is described in more detail with reference to the flow chart shown in FIG. 5.

Figure 5:
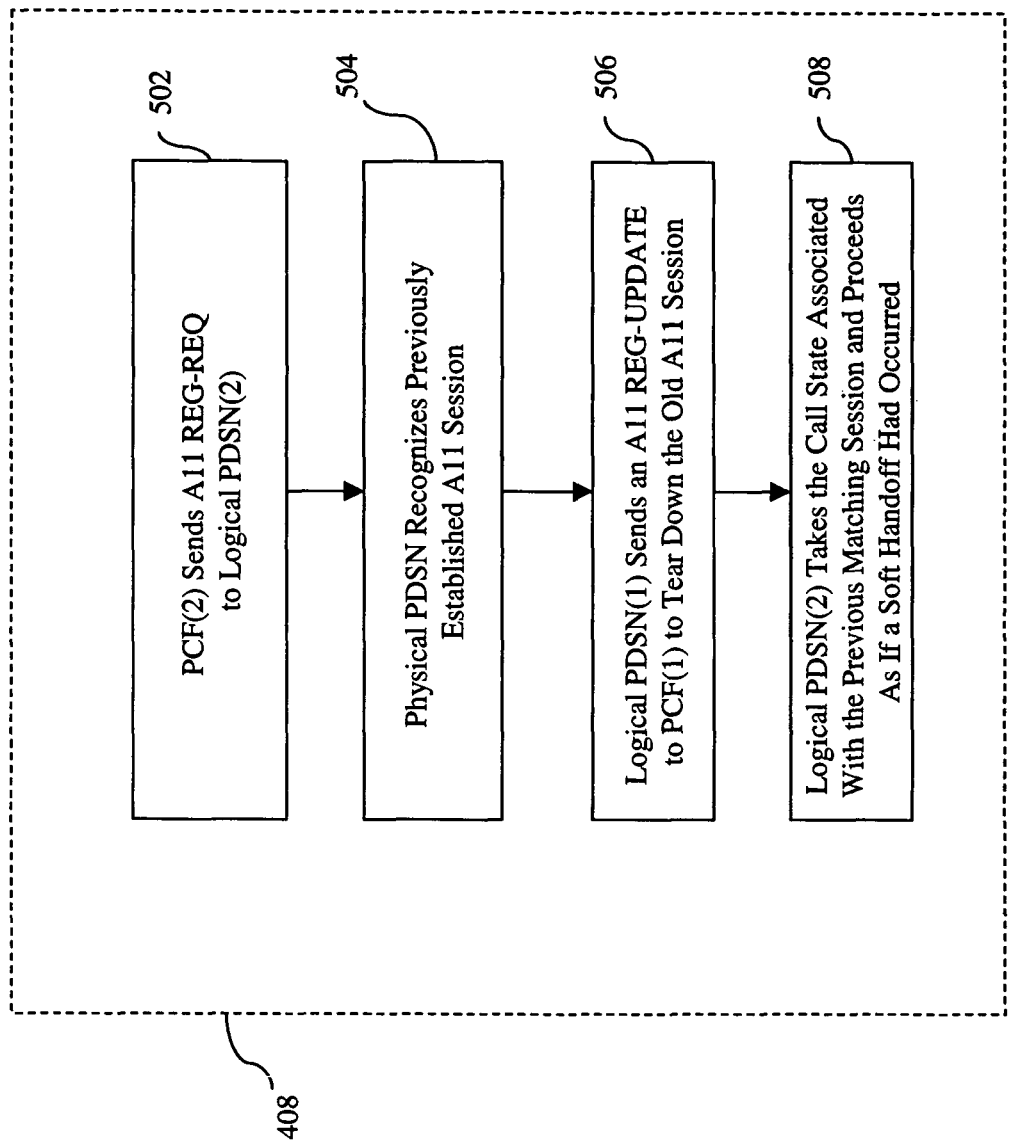
FIG. 5 is a more detailed flow chart of the fourth step depicted in FIG. 4 according to one embodiment of the present invention.

Referring now to FIG. 5, the step of the MS1 establishing a new A10/A11 session with PDSN(2) (step 408, FIG. 4) preferably includes the following steps. In step 502, PCF(2) sends an A11 REG-REQ (which includes the previous PCF IP address) to PDSN(2). It should be noted that, as explained above with reference to FIG. 3, PDSN(2) is within the same physical PDSN as PDSN(1).

In step 504, the physical PDSN is able to recognize that an A11 session is already established for MS1. In particular, the PDSN reviews the subscriber ID and the connection ID of MS1 signaled via an A11 Registration Request (both of these types of identification are known in the art). Upon realizing that PCF(1) was previously communicating with it (only at a different logical PDSN), the physical PDSN converts the hard handoff into a soft handoff.

Next, in step 506, PDSN(1) sends a REG-UPDATE to PCF(1) to tear down the old A11 session. In particular, PCF(1) "acks" the update (i.e. sends an Acknowledgment packet) and sends a REG-REQ to PDSN(1) with a lifetime of zero (instructing the call to be torn down). PDSN(1) acknowledges with an A11 REQ-RSP, and the original session is closed. It should be noted that step 506 occurs at the same time that PDSN(2) is sending a REG-RSP back to PCF(2) (in response to the REG-REQ sent according to step 502).

In step 508, PDSN(2) takes the upper call state (which includes, for example, QoS state (traffic policing/shaping/marking state), MIP state, tunneling state (L2TP, IPSEC, IP/IP, IP/GRE), and security parameters such as packet filtering and firewall state) associated with the previous matching session, and PDSN(2) proceeds as if a soft handoff had occurred (e.g., it does not renegotiate PPP with MS1). As will be understood by persons versed in the art, this upper call information that is used by PDSN(2) may include, in addition to PPP parameters, all the policy information on how to handle MS1, such as traffic policing, as well as compression state, tunneling parameters, QoS parameters, security parameters (such as packet filters, firewall state, IPSEC state), and Mobile IP state.

It will be appreciated that, in the manner described above, many of the problems associated with using a PDSN 341 having multiple IP addresses and interfaces are resolved. In particular, the risk of internal hard handoffs is eliminated or at least substantially reduced. This, in turn, increases the ability to use such a PDSN 341, in order to achieve higher throughput and redundancy, for example, without risking the effects of internal hard handoffs.

Although the invention has been described and illustrated in the foregoing illustrative embodiments, it is understood that the present disclosure has been made only by way of example, and that numerous changes in the details of implementation of the invention can be made without departing from the spirit and scope of the invention. Moreover, it will be understood that certain features which are well known in the art have not been described in order to avoid complication of the subject matter of the present invention. The present invention is limited only by the claims which follow.

What is claimed is:

1. A wireless communication system comprising:
a packet data serving node (PDSN) in communication with a first base transceiver station (BTS) and a second BTS, the PDSN having a first logical PDSN that has at least a first IP address and a second logical PDSN that has a second IP address different from the first IP address;
the first logical PDSN having multiple internet protocol (IP) addresses; and
the first logical PDSN for communicating with a mobile station (MS) associated with one of the IP addresses in a first session through a first BTS; and
in response to the MS requesting a second session with an IP address of the second logical PDSN through a second BTS, the PDSN recognizing that the first session is already established for the MS on the PDSN, the second logical PDSN utilizing upper call state and policy parameters for the first session and handing off between the IP address of the first logical PDSN and the IP address of the second logical PDSN without re-negotiating all call parameters.

2. The system of claim 1, wherein the PDSN has a separate physical interface for each IP address.

3. The system of claim 1, wherein the system operates in at least one of Simple IP mode and Mobile IP mode.

4. The system of claim 1, wherein the PDSN includes a physical PDSN on which multiple logical PDSNs reside.

5. The system of claim 1, wherein the PDSN establishes the second session after a failure in the wireless communication system requires termination of the first session.

6. The system of claim 1, further comprising a first base station controller (BSC) that is associated with the first BTS and a second BSC that is associated with the second BTS.

7. The system of claim 1, wherein the first and second sessions are each A10 sessions.

8. The system of claim 7, wherein the A10 sessions are established using the A11 protocol.

9. A method for performing a handoff comprising:
establishing a first session for a mobile station (MS) in a mobile communication network using a first logical access gateway identified by a first IP address and a first interface, the first logical access gateway residing on an access gateway that provides the MS access to at least one internet protocol (IP) network;
receiving a request for a second session from the MS in the mobile communication network, wherein the request is received at a second logical access gateway identified by a second IP address and a second interface, each different from the first IP address and first interface, the second logical access gateway, residing on the access gateway; and
in response to receiving the request, recognizing that the first session is already established on the access gateway and treating the handoff between the first logical access gateway and the second logical access gateway of the access gateway as a soft handoff and not as a hard handoff such that all call parameters are not re-negotiated.

10. The method of claim 9, wherein the mobile communication network uses a code division multiple access (CDMA) access technique.

11. The method of claim 9, further comprising establishing multiple sessions with multiple MSs using respective IP addresses of the access gateway.

12. The method of claim 9, wherein the first and second interfaces are separate physical interfaces for each IP address of the access gateway.

13. The method of claim 9, wherein the session established operates in at least one of Simple IP mode and Mobile IP mode.

14. The method of claim 9, wherein the access gateway is a packet data serving node (PDSN) implementing multiple logical PDSNs.

15. The method of claim 9, wherein establishing a second session comprises maintaining upper-layer call functions associated with the MS.

16. The method of claim 9, wherein establishing a first session comprises negotiating a plurality of call parameters.

17. The method of claim 16, wherein establishing a second session comprises maintaining at least some of the call parameters.

18. The method of claim 9, wherein the first and second sessions are each A10 sessions.

19. The method of claim 18, wherein the A10 sessions are established using the A11 protocol.

20. The method of claim 9, further comprising examining the subscriber ID associated with the MS, by the access gateway, to determine that the handoff should be treated as a soft handoff.

21. The method of claim 9, further comprising examining the connection ID associated with the MS, by the access gateway, to determine that the handoff should be treated as a soft handoff.

22. The method of claim 9, wherein each of the IP addresses of the access gateway are associated with a separate logical access gateway.

23. An access gateway, which provides access to at least one internet protocol (IP) network, having multiple internet protocol (IP) addresses for use in a wireless communication network and at least one logical access gateway with each logical access gateway identified by an IP address, the access gateway having a first session with a mobile station (MS) using a first of its IP addresses and a second session with the same MS using a second of its IP addresses, wherein the handoff between the first IP address and the second IP address of the access gateway is treated as a soft handoff and not as a hard handoff such that all call parameters are not re-negotiated and at least some parameters associated with the first session are used for the second session.

24. The access gateway of claim 23, wherein each of the IP addresses of the access gateway are associated with a separate logical access gateway.

25. The access gateway of claim 23, wherein the access gateway comprises a separate physical interface for each IP address.

26. The access gateway of claim 23, wherein the access gateway is a packet data serving node (PDSN).

27. A method comprising:
a packet data service node (PDSN) having a first logical PDSN with a first IP address and a first interface using the first logical PDSN to establish a session between a mobile station (MS) and the first logical PDSN, including negotiating point-to-point protocol (PPP) parameters;
the PDSN detecting that a MS is attempting to establish a new session with a second logical PDSN that is part of the PDSN, the second logical PDSN including a second IP address and a second interface;
the PDSN determining that a session is already established for the MS; and
the PDSN converting a hard handoff into a soft handoff, such that the second logical PDSN takes the upper call state including quality of service state, tunneling state, and security parameters associated with the first session without renegotiating the PPP parameters with the MS;
the PDSN thereby having multiple IP addresses and interfaces while reducing the likelihood of internal hard handoffs.

28. The method of claim 27, wherein the sessions are A10/A11 sessions.

29. The method of claim 28, wherein the PDSN is able to determine that an A11 session has already established for the MS by reviewing the subscriber ID and the connection ID of the MS signaled via an A11 Registration Request.

* * * * *

UNITED STATES PATENT AND TRADEMARK OFFICE
CERTIFICATE OF CORRECTION

PATENT NO. : 8,031,671 B2  
APPLICATION NO. : 10/893846  
DATED : October 4, 2011  
INVENTOR(S) : Matthew H. Harper et al.

Page 1 of 1

It is certified that error appears in the above-identified patent and that said Letters Patent is hereby corrected as shown below:

In the Claims:

Please correct claim 24 to read as follows:

24. The access gateway of claim 23, wherein each of the [[1P]] IP addresses of the access gateway are associated with a separate logical access gateway.

Please correct claim 25 to read as follows:

25. The access gateway of claim 23, wherein the access gateway comprises a separate physical interface for each [[1P]] IP address.

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,031,671 B2 | Page 1 of 1 |
| APPLICATION NO. | : 10/893846 | |
| DATED | : October 4, 2011 | |
| INVENTOR(S) | : Matthew H. Harper et al. | |

It is certified that error appears in the above-identified patent and that said Letters Patent is hereby corrected as shown below:

In the Claims:

Column 11, lines 5-7, please correct claim 24 to read as follows:

24. The access gateway of claim 23, wherein each of the [[1P]] IP addresses of the access gateway are associated with a separate logical access gateway.

Column 11, lines 8-10, please correct claim 25 to read as follows:

25. The access gateway of claim 23, wherein the access gateway comprises a separate physical interface for each [[1P]] IP address.

This certificate supersedes the Certificate of Correction issued April 17, 2012.

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,031,671 B2
APPLICATION NO. : 10/893846
DATED : October 4, 2011
INVENTOR(S) : Matthew H. Harper et al.

It is certified that error appears in the above-identified patent and that said Letters Patent is hereby corrected as shown below:

In the Claims:

Column 11, lines 5-7, please correct claim 24 to read as follows:

24. The access gateway of claim 23, wherein each of the [[1P]] IP addresses of the access gateway are associated with a separate logical access gateway.

Column 11, lines 8-10, please correct claim 25 to read as follows:

25. The access gateway of claim 23, wherein the access gateway comprises a separate physical interface for each [[1P]] IP address.

This certificate supersedes the Certificates of Correction issued April 17, 2012 and May 8, 2012.

Signed and Sealed this
Fourth Day of September, 2012

David J. Kappos
*Director of the United States Patent and Trademark Office*

CERTIFICATE OF CORRECTION (continued)
U.S. Pat. No. 8,031,671 B2

Column 11, line 13 – Column 12, line 12, please correct claim 27 to read as follows:

27. A method comprising:

a packet data service node (PDSN) having a first logical PDSN with a first [[1P]] IP address and a first interface using the first logical PDSN to establish a session between a mobile station (MS) and the first logical PDSN, including negotiating point-to-point protocol (PPP) parameters;

the PDSN detecting that a MS is attempting to establish a new session with a second logical PDSN that is part of the PDSN, the second logical PDSN including a second [[1P]] IP address and a second interface;

the PDSN determining that a session is already established for the MS; and the PDSN converting a hard handoff into a soft handoff, such that the second logical PDSN takes the upper call state including quality of service state, tunneling state, and security parameters associated with the first session without renegotiating the PPP parameters with the MS;

the PDSN thereby having multiple [[1P]] IP addresses and interfaces while reducing the likelihood of internal hard handoffs.

Column 12, lines 15-18, please correct claim 29 as follows:

29. The method of claim 28, wherein the PDSN is able to determine that an A11 session has already established for the MS by reviewing the subscriber [[1D]] ID and the connection [[1D]] ID of the MS signaled via an A11 Registration Request.